United States Patent
Riva et al.

(10) Patent No.: US 10,850,327 B2
(45) Date of Patent: Dec. 1, 2020

(54) GAS FLOW WITHIN ADDITIVE MANUFACTURING DEVICES

(71) Applicant: TRUMPF SISMA S.r.l., Piovene Rochette (IT)

(72) Inventors: Fausto Riva, Piovene Rocchette (IT); Sergio Canaglia, Piovene Rocchette (IT)

(73) Assignee: TRUMPF SISMA S.r.l., Piovene Rocchette (IT)

( * ) Notice: Subject to any disclaimer, the term of this patent is extended or adjusted under 35 U.S.C. 154(b) by 631 days.

(21) Appl. No.: 15/604,173

(22) Filed: May 24, 2017

(65) Prior Publication Data

US 2017/0259339 A1 Sep. 14, 2017

Related U.S. Application Data

(63) Continuation of application No. PCT/EP2015/077356, filed on Nov. 23, 2015.

(30) Foreign Application Priority Data

Nov. 24, 2014 (EP) .................................... 14194592

(51) Int. Cl.
*B22F 3/105* (2006.01)
*B33Y 30/00* (2015.01)
(Continued)

(52) U.S. Cl.
CPC ............ *B22F 3/1055* (2013.01); *B28B 1/001* (2013.01); *B29C 64/153* (2017.08); *B29C 64/25* (2017.08);
(Continued)

(58) Field of Classification Search
CPC .................................................... B22F 3/1055
See application file for complete search history.

(56) References Cited

U.S. PATENT DOCUMENTS 4,767,299 A * 8/1988 Friesen .................. B29C 41/04
425/135
6,105,592 A * 8/2000 Thompson ........ H01L 21/67034
134/105
(Continued)

FOREIGN PATENT DOCUMENTS

CN 101903124 A 12/2010
CN 102574333 A 7/2012
(Continued)

OTHER PUBLICATIONS

Office Action in Chinese Application No. 201580063857.0, dated Jul. 25, 2018, 14 pages (with English translation).
(Continued)

*Primary Examiner* — Christopher S Kessler
(74) *Attorney, Agent, or Firm* — Fish & Richardson P.C.

(57) ABSTRACT

Devices for additive manufacturing of a three-dimensional object from powdered material include a main body providing an object forming chamber and, within a front wall, an opening for accessing the object forming chamber. A work surface delimits the object forming chamber and includes a build platform section for manufacturing thereon the three-dimensional object. A door is provided at the front wall and positionable in a closed state to seal the opening or in an opened state to provide access to the object forming chamber. The devices include a gas flow system for providing a gas flow across the build platform section and including a main body section extending within the main body and a door section being part of the door and including an opening structure arranged to release gas to, or to receive gas from, above the build platform section in the closed state of the door.

15 Claims, 5 Drawing Sheets

(51) Int. Cl.
  *B29C 64/153* (2017.01)
  *B29C 64/25* (2017.01)
  *B29C 64/371* (2017.01)
  *B33Y 10/00* (2015.01)
  *B28B 1/00* (2006.01)

(52) U.S. Cl.
  CPC ............ *B29C 64/371* (2017.08); *B33Y 10/00* (2014.12); *B33Y 30/00* (2014.12); *B22F 2003/1056* (2013.01); *B22F 2003/1059* (2013.01); *Y02P 10/25* (2015.11)

(56) References Cited

U.S. PATENT DOCUMENTS

2004/0003738 A1* 1/2004 Imiolek ................. B22F 3/1055
  101/480
2015/0298394 A1* 10/2015 Sheinman ............. B29C 64/106
  427/402

FOREIGN PATENT DOCUMENTS

| | | | |
|---|---|---|---|
| CN | 202639330 U | 1/2013 | |
| CN | 104741608 A | 7/2015 | |
| DE | 102004041633 A1 | 3/2003 | |
| DE | 102006014835 A1 | 10/2007 | |
| DE | 1020100522206 A1 | 5/2012 | |
| EP | 2 492 084 | 8/2012 | ............. B29C 67/00 |
| EP | 2 687 305 | 1/2014 | ............. B22F 3/105 |
| EP | 2732890 A2 | 5/2014 | |
| EP | 2492075 B1 | 5/2015 | |
| WO | WO2006/024373 A2 | 3/2006 | |
| WO | WO2010007394 A1 | 1/2010 | |

OTHER PUBLICATIONS

International Search Report and Written Opinion of the International Searching Authority for corresponding PCT Application No. PCT/EP2015/077356, dated Feb. 15, 2016, 9 pages.

* cited by examiner

GAS FLOW WITHIN ADDITIVE MANUFACTURING DEVICES

CROSS-REFERENCE TO RELATED APPLICATIONS

This application is a continuation of and claims priority under 35 U.S.C. § 120 to PCT Application No. PCT/EP2015/077356 filed on Nov. 23, 2015, which claims priority to European Application No. EP 14194592.3, filed on Nov. 24, 2014. The entire contents of these priority applications are incorporated herein by reference.

TECHNICAL FIELD

The present disclosure relates generally to additive manufacturing devices and more particularly to controlling smoke during additive manufacturing using an inert gas flow.

BACKGROUND

Additive manufacturing, such as selective laser sintering or selective laser melting, is usually performed in a gas-tight object forming chamber. In the chamber, a powdered material, such as metal or ceramic powder, is irradiated with electromagnetic radiation such as laser light. Therefore, a thin layer of powder is provided within the chamber on a build platform, which forms the bottom for the three-dimensional object. In a stepwise production, the three-dimensional object is manufactured, for example, layer by layer. A wiper structure is used between steps to re-distribute powder on top of the partly manufactured material to form the next layer.

EP 2 732 890 A2 discloses an example of a device for additive manufacturing. The object forming chamber includes usually a sequence of multiple sections including a processing section in-between a powder supply section and an unused powder section. The sequence is usually arranged within the chamber such that all sections can be easily accessed through an opening of the device. The direction of alignment of those sections is herein referred to as a lateral direction.

For manufacturing, a laser source may provide a laser beam that is directed onto the build platform and is absorbed by the powder to melt the same. Accordingly, optical elements are required for guiding the laser beam. Moreover, the laser beam will pass an output lens or an output window prior interaction before focusing down into the powder. During interaction of the laser beam with the powder, smoke is generated within the chamber. Particles from the smoke may deposit on the surfaces of the optical elements or the output lens or output window. The deposits may affect, for example, the laser performance. Also other internal elements provided within the chamber such as process sensors (e.g., video camera, pyrometer, thermometer, and/or oxygen sensor) may be affected.

It is also known to apply an inert gas flow within the chamber for protection of, for example, the optical elements from smoke deposit formation. Examples of such configurations are disclosed, for example, in DE 10 2010 052 206 A1, DE 10 2006 014 835 A1, and WO 2010/007394 A1. These configurations disclose, in particular, a gas flow in a longitudinal direction.

SUMMARY

The present disclosure is directed, at least in part, to improving or overcoming one or more issues of the above systems or configurations and, in particular, to providing an efficient smoke removing flow of inert gas during manufacturing.

One aspect of the present disclosure features devices for additive manufacturing of a three-dimensional object from a powdered material. The device includes a main body providing an object forming chamber and, within a front wall of the main body, an opening for accessing the object forming chamber, a work surface delimiting the object forming chamber and having a build platform section for manufacturing thereon the three-dimensional object, a door provided at the front wall and being positionable in a closed state to seal the opening and in an opened state to provide access to the object forming chamber, and a gas flow system for providing a gas flow across the build platform section. The gas flow system includes a first main body section extending within the main body and a door section being part of the door. In particular, the language "being part of the door" includes that the door section can be an integrated part of the door and/or an attached part of the door. The door section includes a first opening structure arranged to release gas to or to receive gas from the build platform section in the closed state of the door.

Another aspect of the present disclosure features methods of removing smoke generated during operation of a device for additive manufacturing of a three-dimensional object from a powdered material, where the smoke is generated in a processing region within an object forming chamber. The methods include providing a gas flow that extends across the processing region between a door delimiting the object forming chamber at a front wall and a back side delimiting the object forming chamber at the side opposite to the door with respect to the processing region. For example, the gas flow originates from the door and ends at the back side, and gas can be released/received at respective openings in the door and in the back side to form the gas flow.

A further aspect of the present disclosure features methods of removing smoke generated during operation of a device for additive manufacturing of a three-dimensional object from a powdered material in a processing region within an object forming chamber. The methods include providing a gas flow from a first opening structure of a gas flow system into the object forming chamber to extend across the processing region between a door delimiting the object forming chamber at a front wall of a main body of the device and a back side of the main body delimiting the object forming chamber opposite to the door with respect to the processing region; and removing the gas including the generated smoke from the object forming chamber through a second opening structure of the gas flow system. The second opening structure is opposite to the first opening structure with respect to the processing region. One of the first and second opening structures is included in a door section of the gas flow system, the door section is an integrated part or is attached to the door, and the other one of the first and second opening structures is attached to or integrated into the back side. The methods can further include closing the door to seal an opening within the front wall to thereby gas-tight seal the object forming chamber, such that the door section is fluidically coupled to a first main body section of the gas flow system that extends within the main body. The other one of the first and second opening structures can be included in a second main body section of the gas flow system, and the first main body section, the door section, and the second main body section can provide a recirculated flow path of gas through the object forming chamber when the door is closed.

Other features and aspects of this disclosure will be apparent from the following descriptions, the dependent claims, and the accompanying drawings.

DETAILED DESCRIPTION

The following is a detailed description of examples of embodiments of the present disclosure. The embodiments described therein and illustrated in the drawings are intended to teach the principles of the present disclosure, enabling those of ordinary skill in the art to implement and use the present disclosure in many different environments and for many different applications. Therefore, the embodiments described herein are not intended to be, and should not be considered as, a limiting description of the scope of patent protection. Rather, the scope of patent protection shall be defined by the appended claims.

The disclosure is based in part on the realization that by providing a gas flow across the build platform section from the front to the back (or vice versa), a localized and efficient removal of smoke can be achieved during the manufacturing process. In particular, it has been realized that, for generating such a flow, a respective gas flow system can at least partly be integrated into a door of an additive manufacturing device. Thereby, such a flow may be generated in particular for configurations, in which a powder supply region, a processing region, and an unused powder region are aligned laterally, e.g., along an access side that can be closed with the door.

In general, such manufacturing processes are performed in a gas-tight sealable chamber that can be flooded with inert gas. Such an environment of an inert gas will avoid or at least reduce that, for example, base metals react with oxygen present in the chamber. During the manufacturing, smoke may nevertheless be generated and distribute within the inert gas atmosphere. As mentioned above, smoke particles may affect, for example, optical elements. Specifically, deposits of the smoke may form on the optical elements and, thereby, may affect the beam quality and may even damage the optical elements by absorption.

Herein, a concept is disclosed that may allow using the flow of inert gas to reduce or even to avoid any deposits within the chamber. In particular, the concepts are based, at last in part, on the recirculation of inert gas by using the door of the device. Moreover, the concepts allow the formation of a flow that is at least partly independent from the movement of the powder distributor of the powder, in particular by forming a flow transverse to the movement of the powder distributor. Moreover, the concepts disclosed herein may allow a reduction in size and furthermore optimize any space needed for a respective gas flow system. Moreover, the configurations disclose herein can be implemented in a manner that allows for easy cleaning and maintenance.

FIGS. 1 to 4 illustrate schematically a device 1 for additive manufacturing of a three-dimensional object 3 from a powdered material 5. The device 1 is also referred to as a 3D-printing system, a selective laser sintering machine, or a selective laser melting machine, or the like. The device 1 can be operated, for example, similar to the device described in EP 2 732 890 A2.

Figure 1:
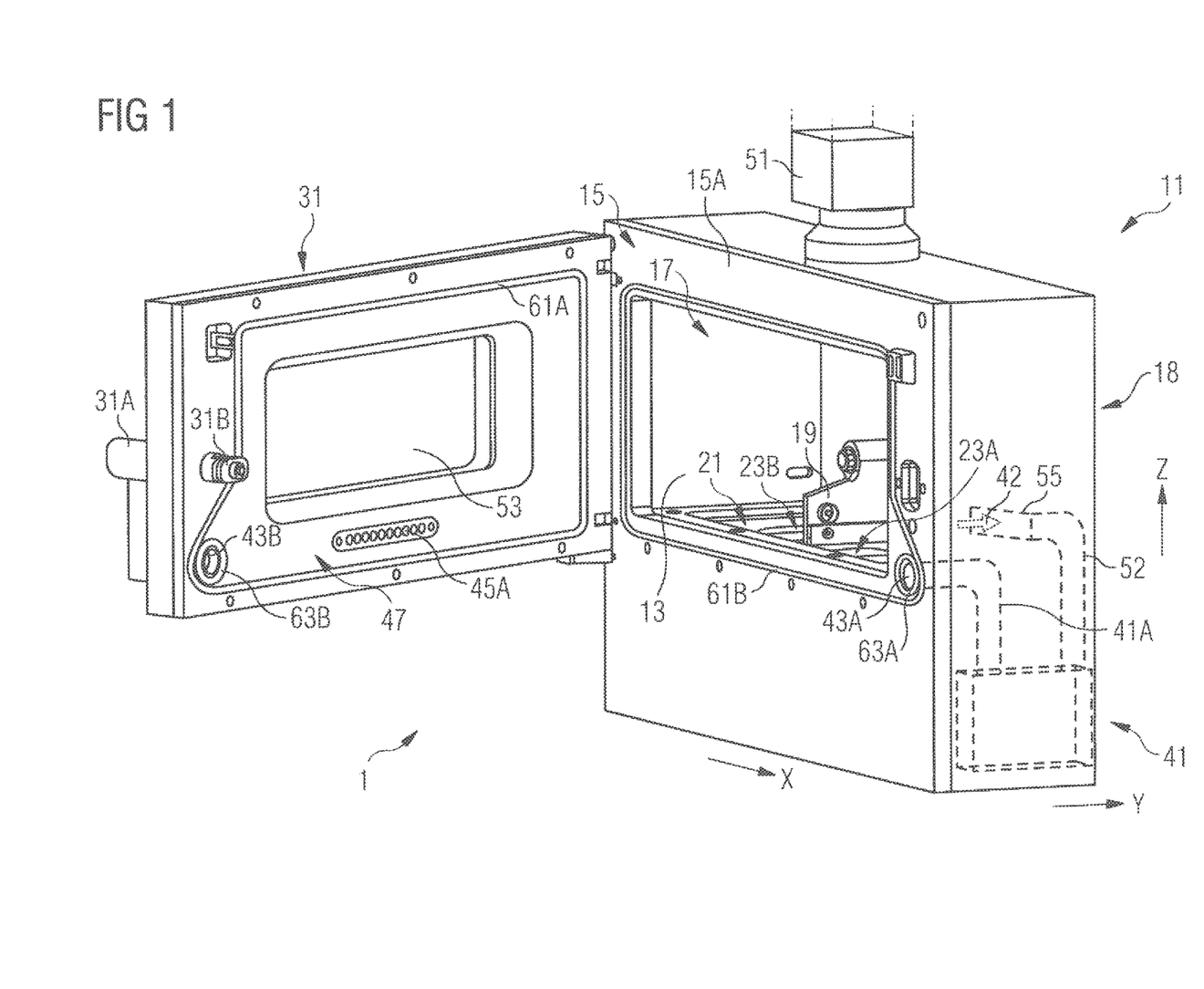
FIG. 1 is a schematic perspective view of an exemplary additive manufacturing device.

Referring to FIG. 1, the device 1 includes a main body 11, which provides an object forming chamber 13. A front wall 15 delimits the chamber 13 at a front side. Specifically, a front frame 15A forms (or defines) an opening 17 through which the chamber 13 within the main body 11 can be accessed.

The processing is performed on a work surface 21, which delimits the chamber 13 at a bottom side and provides inter alia a build platform section 23A. The build platform section 23A may be provided centrally with respect to the opening 17. On the build platform section 23A, the manufacturing process takes place, e.g., within a processing region defined on the build platform section 23A.

The main body 11 further includes a back side 18 and may further house at least parts of a gas flow system 41 such as a gas reservoir for, e.g., inert gas, and a pumping system (not shown). Furthermore, on top of the main body 11, a laser system 51, such as a fiber or a disc laser and a scanner system, may be mounted or light of a laser system may be guided to the top of the main body 11 for being coupled into the chamber 13, e.g., through an optical window. The laser beam of the laser system 51 is directed on top of the build platform section 23A, e.g., to sinter or to completely melt the powdered material 5 along a desired trajectory.

Figure 2:
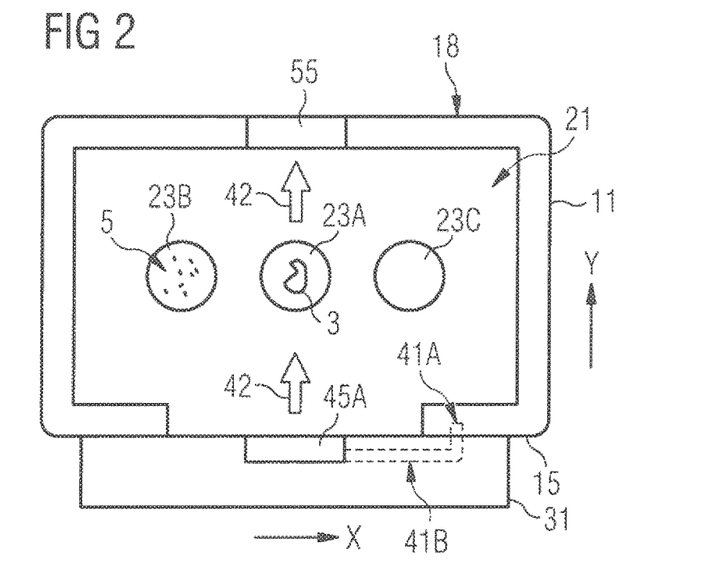
FIG. 2 is a schematic cut view of the device of FIG. 1 parallel to the XY-plane and extending through an object forming chamber of the device.

Furthermore, the device 1 includes a door 31 attached to the front wall 15 for closing the object forming chamber 13 during processing. In some implementations, the door 31 can be locked in a closed state via a door handle 31A and a lock 31B. FIG. 2 shows such a closed state of the door 31.

In an open state, as shown in FIG. 1, the door 31 is opened to allow access through the opening 17 to the chamber 13. Accordingly, a user can take necessary steps in preparation of the processing (e.g., cleaning the inside, refilling powder) and take out any object 3 after completion of the processing. As further shown, for example, in FIG. 1, a depositing device 19 is provided within the chamber 13 to distribute the powdered material 5 within the processing region, e.g., onto the build platform section 23A or any already created portion of object 3.

Figure 3:
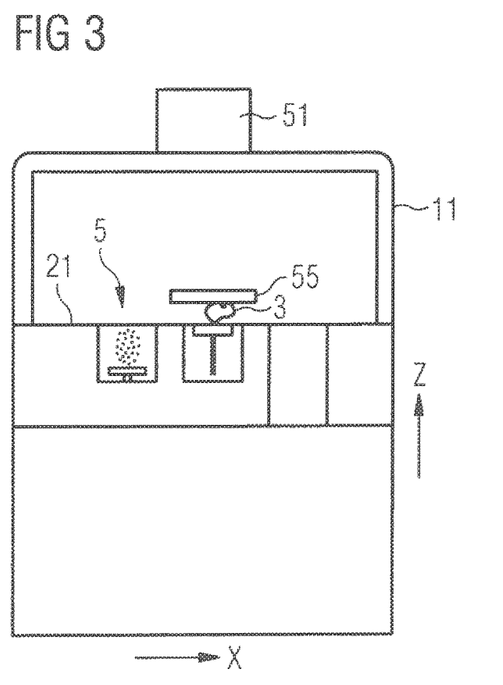
FIG. 3 is a schematic cut view of the device of FIG. 1 parallel to the XZ-plane as indicated in FIG. 2.

As shown in FIG. 2 and FIG. 3, the build platform section 23A is arranged in a lateral direction (X-direction in the drawings) centrally in-between a powder supply region 23B and a powder collecting region 23C. The powder supply region 23B is connected to a powder reservoir, while the powder collecting region 23C collects unused or no longer usable powder remains. The powder collecting region 23C can be optional.

As illustrated in FIG. 1, the depositing device 19 extends in a transverse direction (Y-direction in the drawings) that is orthogonal with respect to the lateral direction of the arrangement of the regions 23A, 23B, and 23C.

Figure 4:
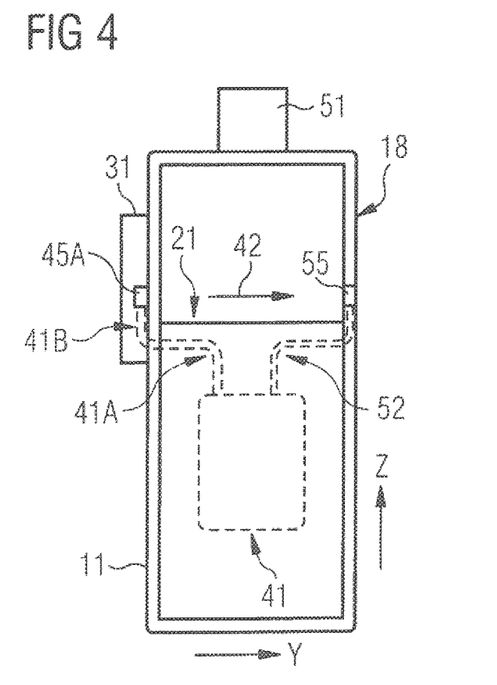
FIG. 4 is a schematic cut view of the device of FIG. 1 parallel to the YZ-plane as indicated in FIG. 2.

A gas flow 42 can be provided to extend across the build platform section 23A in a direction from the door 31 to the back side 18 (or in the reverse direction) as indicated in FIGS. 2 to 4 by an arrow.

To enforce the gas flow 42, the gas flow system 41 can include a first main body section 41A, which extends within the main body 11, and a door section 41B, which is part of the door 31.

The first main body section 41A may be fluidly connected to an inert gas supply chamber of the gas flow system 41, e.g., via a gas pump, if the first main body section 41A is used to supply gas to the chamber 13. Alternatively, the first main body section 41A may be fluidly connected to a gas reservoir, e.g., via a filter, if the first main body section 41A is used to receive gas taken out of the chamber 13.

The door section 41B can include a first opening structure 45A. The first opening structure 45A can be arranged at a position with respect to the door 31 such that, in the closed state of the door 31, gas can be released or received from the processing region, e.g., the region above the build platform section 23A. In some examples, the first opening structure 45A is located in the Y-direction from the build platform section 23A.

The gas flow system 41 can further include a second main body section 52 with a second opening structure 55. The second main body section 52 can include a pipe and the second opening structure 55 can include an exit of the pipe. The second opening structure 55 is positioned opposite to the first opening structure 45A with respect to the build platform section 23A. For example, the second opening structure 55 may be integrated into the back side 18 of the main body 11. The filter can be positioned close to an opening of the second opening structure 55. The filter can also be positioned within the second main body section 52.

In some implementations, the gas flow system 41 is configured to release gas from one of the first opening structure 45A and the second opening structure 55 into the chamber 13 and to receive gas including smoke via the respective other opening. Due to the positioning of the first opening structure 45A and/or the second opening structure 55 in closeness to the processing region, smoke can be efficiently directed out of the object forming chamber 13 and, thus, avoid or at least reduce any contamination of optical elements of the laser system 51.

The gas flow system 41 can be configured as a closed loop system or be comprised of separate systems (e.g., one supply section and one receiving section) where the removed gas may be processed and cleaned prior to reuse.

Referring again to FIG. 1, the first main body section 41A includes a main body port 43A, for example, located at the front frame 15A of the front wall 15. The door 31 can include a corresponding door port 43B, which is part of the door section 41B and is fluidly connected to first opening structure 45A. In the closed state of the door 31, the main body port 43A and the door port 43B are arranged to form a fluid connection between the first main body section 41A and the door section 41B of the gas flow system 41.

Furthermore, as can be seen in FIG. 1, the device 1 can include a door sealing system (or a door sealer) for providing a tight sealing between the door 31 and the front wall 15 along a circumferential sealing path. The circumferential sealing path can extend, for example, around an observation window 53 provided within the door 31. For example, a main door gasket 61A can interact with a counter main body gasket 61B provided at the front frame 15A. In some implementations, circumferential sealing path and similarly the main door gasket 61A and the main body gasket 61B extend around the opening 17, thereby gas-tight sealing the chamber 13 in the closed state of the door 31.

As shown in FIG. 1, the main body gasket 61B extends also around the main body port 43A and the main door gasket 61A extends similarly around the door port 43B. Accordingly, the fluid connection between the first main body section 41A and the door section 41B is arranged within the sealed chamber 13 such that any leakage from the fluid connection is released into the sealed chamber 13 and does not flow into the surrounding environment.

As shown in FIG. 1, gaskets 63A and 63B provide gas-tight sealing for the main body port 43A and the door port 43B when forming the fluid connection. As in particular shown in FIGS. 3 and 4, the first opening structure 45A and the second opening structure 55 are positioned vertically above work surface 21, i.e., they are displaced in Z-direction. For example, the displacement in Z-direction is in a range from 0 cm to 5 cm, such as 2 cm.

Furthermore, as can be seen in FIGS. 2 and 3, the lateral extension of the first opening structure 45A and/or the second opening structure 55, i.e., the extension in X-direction, is comparable to the lateral extension of the processing region. For example, the lateral extension is in a range from 10 cm to 15 cm for a processing region with a diameter of about 10 cm, e.g., about the same size as or broader than the processing region. This allows providing a linear (or at least to some extent) flow profile across the processing region. Alternative configurations for providing desired flow configurations are described below in connection with FIGS. 8 and 9.

A first exemplary embodiment for the door section 41B of the gas flow system 41 is explained in the following in combination with FIGS. 5 to 7.

Figure 5:
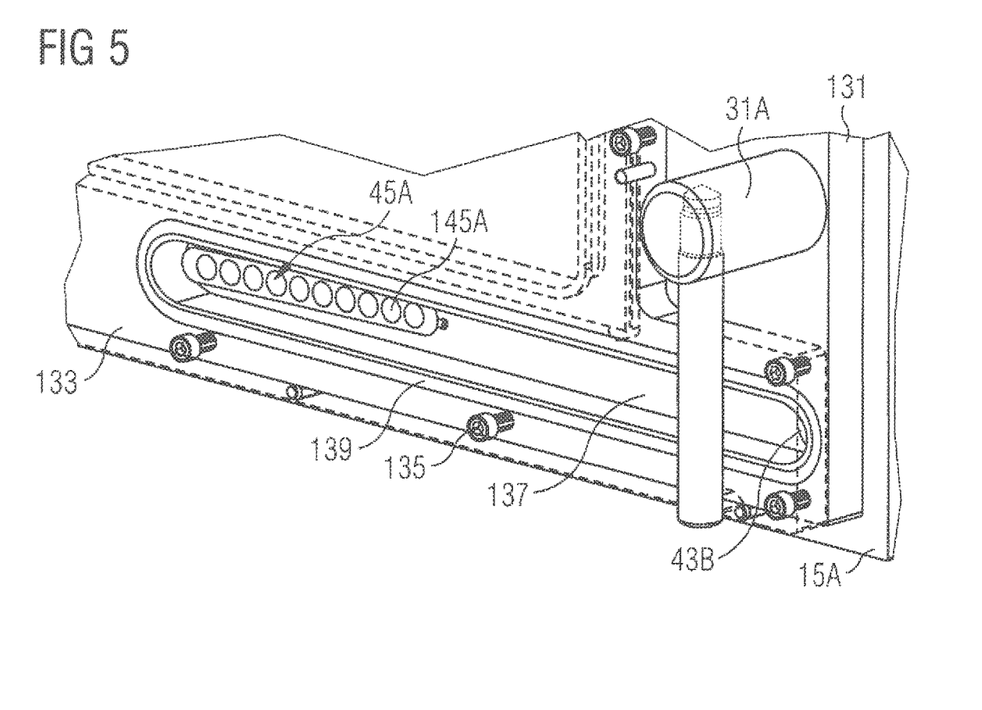
FIG. 5 is an enlarged schematic perspective view of a section of a door of the additive manufacturing device shown in FIG. 1 for illustrating a door section of a gas flow system integrated in the door.

FIG. 5 shows a section of the door 31, which includes the door port 43B and the first opening structure 45A. Specifically, the door 31 includes a door plate 131 and a cover plate 133. The cover plate 133 is attached with screws 135 to the door plate 131. A channel 137 is formed in between the door plate 131 and the cover plate 133. The channel 137 is sealed by a channel gasket 139 positioned between the door plate 131 and the cover plate 133 and surrounding the channel 137. The door port 43B is partly shown and provides the fluid connection between the first main body section 41A of the gas flow system 41 and the channel 137, when the door 31 is closed.

Figure 6:
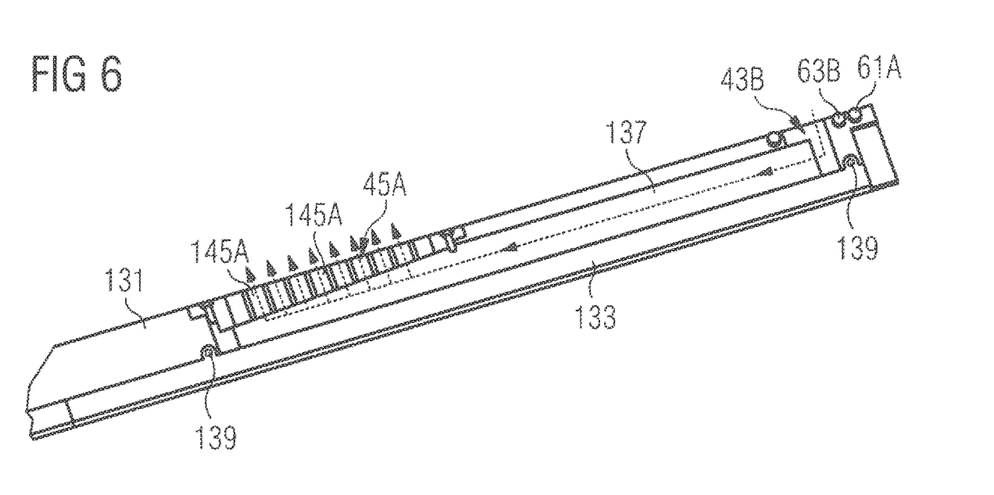
FIG. 6 is a schematic cut view of the door shown in FIG. 5 parallel to the XY-plane and extending through the door section of the gas flow system.
Figure 7:
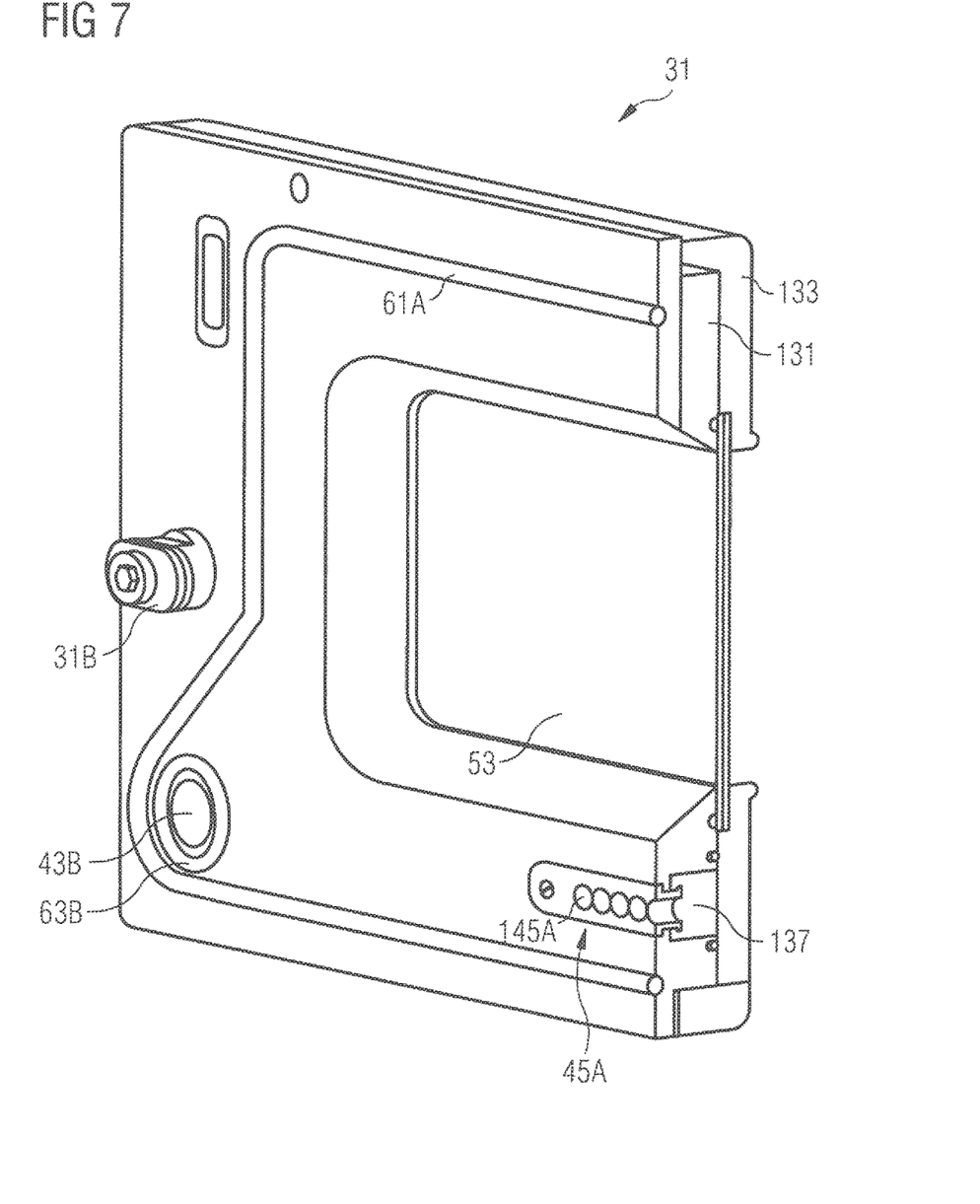
FIG. 7 is a schematic perspective view of one half of the door shown in FIG. 5 for illustrating the structure of the door section of the gas flow system.

FIG. 6 shows a cut view along the channel 137 within the door 31, while FIG. 7 shows a cut in Z-direction (vertical cut) through the door 31 in the region of the first opening structure 45A.

In particular, it is shown that the first opening structure 45A is made of a separate unit that includes a series of through holes 145A. Each through hole 145A extends in the closed state in Y-direction and the orientation of the series is in X-direction. As further shown in FIG. 6, the first opening structure 45A is tapered along the series of through holes 145A such that, for the case of gas being released through the first opening structure 45A, a pressure drop along X-direction due to gas exiting through the first couple of through holes 145A is compensated for the downstream located through holes. For example, the cross section of the channel 137 narrows down to about 50% along the extension of the first opening structure 45A. However, it is noted that the pressure drop and its effects may depend on the pressure range, the dimensions of the channel 137 and/or the size of the through holes 145A.

Alternatively or additionally, for example, the shape and/or size of the through holes may be adjusted to vary the flow resistance along the series of through holes.

The above is an exemplary embodiment of a channel formation based on some type of recess provided within the door 31 and covered by some structural element (e.g., as an integrated part). While the channel 137 shown in FIGS. 5 to 7 is provided within the door plate 131, alternatively or additionally, the channel 137 may be formed in the cover plate 133 to form the door section 41B as an integrated part of the door 31.

Figure 8:
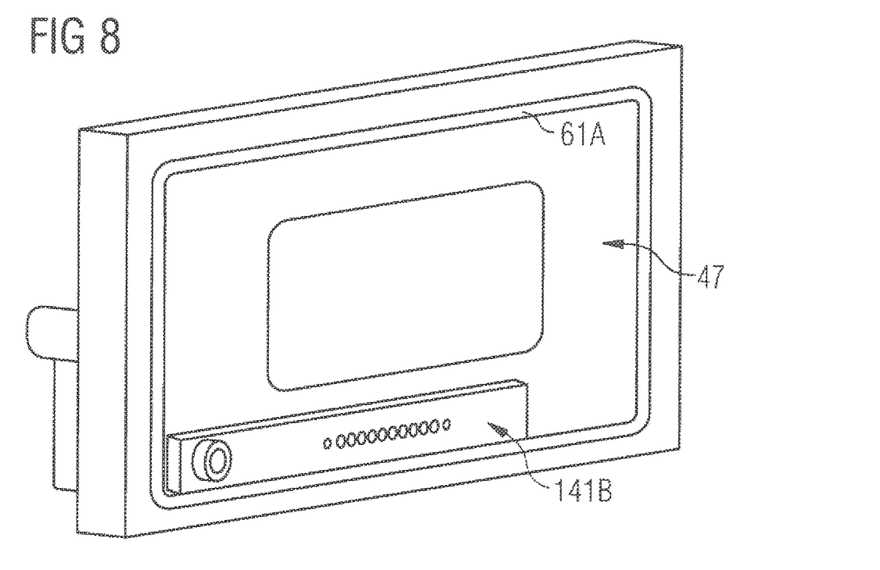
FIG. 8 and FIG. 9 are schematic views of further embodiments of a door-section of a gas flow system.
Figure 9:
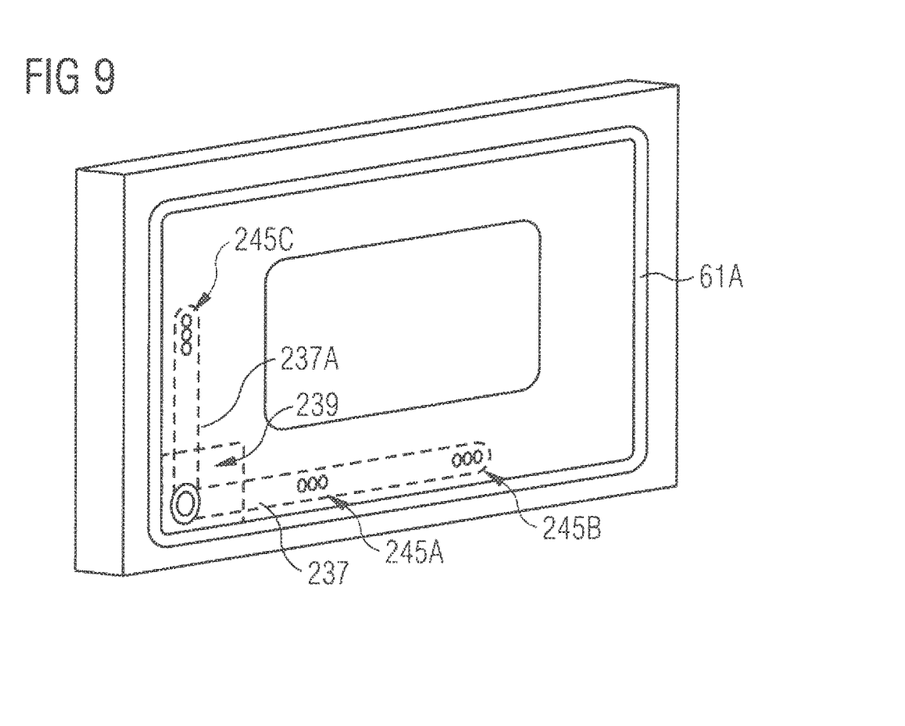

Alternative configurations of the door section 41B are shown in FIGS. 8 and 9.

In the embodiment of FIG. 8, a separate channel unit 141B is attached to an inner face 47 of the door 31 (as a separate part) that is delimited by the main door gasket 61A. Accordingly, the front wall 15 of the main body 11 may need adaptation to provide a laid back position of the main body port 43A. The separate channel unit 141B may extend into the chamber 13, thereby providing even closer releasing/receiving of gas with respect to build platform section 23A. Moreover and in contrast to the door-integrated configuration, the separate channel unit 141B provides the possibility to retrofit an existing gas flow system to existing door designs.

A further example of a separate channel configuration may be based on rigid or flexible pipes, which can be attached at or guided through the door 31. In some embodiments, those pipes may be fluidly connected to the first main body section 41A via the door port 43B and the main body port 43A. Combinations of integrated configurations and/or separate part configurations for the door section 41B may be provided.

FIG. 9 illustrates configurations in which the door section 41B includes more than one channel and/or more than one opening structure per channel. Channels extending to different positions at the door 31 may allow releasing air into the chamber 13 from different positions and, thus, forming a desired flow distribution within the chamber 13.

For example, to provide a linear gas flow across the build platform section 23A in a wider lateral range, two laterally displaced opening structures 245A and 245B are shown in FIG. 9. Laterally displaced opening structures 245A and 245B are fluidly connected with and, for example, supplied with gas via a common channel 237.

FIG. 9 further illustrates a vertically (in Z-direction) extending a second channel 237A for providing inert gas in a region of the chamber 13 that is at some height above work surface 21. Specifically, the channel 237A is fluidly connected with an opening structure 245C that includes a sequence of vertically arranged through holes for releasing/receiving gas.

Moreover, FIG. 9 illustrates schematically a two-way-valve 239 as an example for a valve-controlled gas supply/reception by different channels. In some cases, the two-way-valve 239 is configured to selectively fluidly connect the channel 237 and/or the channel 237A with the door port 43B. Thereby, depending on the type of processing or a stage of processing, smoke removal and/or, for example, cooling/heating of the chamber 13 may be activated.

As disclosed above, various configurations of a gas flow system (for example, partly integrated into a door or as separate parts mounted thereon) may simplify changing between different powder types and simplify required cleaning of the device from any unwanted powder (having, for example, particle sizes in the range from a few micrometers to tens of micrometers) when switching between powder types. Particularly for integrated configurations, this may be caused essentially by no added surface structure such as edges, corners, narrow ridges or recesses between some added piping and the door's main structure.

Moreover, by providing a flow of gas from the back side to the door or vice versa, e.g., along or against Y-direction (or a Y-axis direction) indicated in the drawings, the disclosed configurations allow that inert gas can be provided to and taken away from the processing region, e.g., from above the build platform section. Thereby, after having caught any smoke from the processing region, gas can be directly taken out of the object forming chamber. Thereby, a large portion of the smoke can be directly removed from the object forming chamber, without any (large amount of) smoke being distributed to other areas within the chamber.

Additionally, providing, for example, a filter at the gas receiving section of gas flow system, may simplify servicing of the gas flow system by replacement of that filter.

Moreover, the configuration disclosed herein may provide for a flow that is transverse, e.g., along Y-direction, and therefore is essentially independent of the movement of the depositing device, in particular if the same extends wiper-like in Y-direction. Moreover, by integration of the respective opening structures into the door—e.g., that a closed door guides and directs gas into the chamber at desired positions—the amount of space, which is needed for the gas flow system within object forming chamber, is reduced. Furthermore, providing the opening structure at the door provides more space to access the object forming chamber in the open state of the door.

Moreover, the gas flow system may include a control unit (or a controller) that can be configured to interrupt any control of inert gas to the door section 41B in case the door is opened and/or that controls any valve, e.g., within the door, for selecting channels.

Moreover, in some embodiments, an opening structure is designed as a specific removable inserter (e.g., flow forming unit or flow former) as shown in FIG. 6. Its shape may be adapted to, e.g., a specific manufacturing process, thereby ensuring a uniform flow distribution within the desired range under varying conditions by simply exchange. For example, the extension in Z-direction of the required uniform flow may depend on the size of the manufactured object.

In general, the various sealings disclosed herein may be performed by form tight sealing and/or gasket or O-ring based sealings.

Finally, examples of additive manufacturing machines in which the herein disclosed concepts can be applied include selective laser sintering or selective laser melting machines such as the "MYSINT100" manufactured by TRUMPF SISMA and TRUMPF.

OTHER EMBODIMENTS

Although the preferred embodiments of this invention have been described herein, improvements and modifications may be incorporated without departing from the scope of the following claims.

A number of embodiments of the invention have been described. Nevertheless, it will be understood that various modifications may be made without departing from the spirit and scope of the invention. Accordingly, other embodiments are within the scope of the following claims.

What is claimed is:

1. A device for additive manufacturing of a three-dimensional object from a powdered material, the device comprising:

a main body providing an object forming chamber and an opening for accessing the object forming chamber, wherein the opening is arranged within a front wall of the main body;

a work surface delimiting the object forming chamber and having a build platform section for manufacturing thereon the three-dimensional object;

a door provided at the front wall and being positionable in a closed state to seal the opening and in an opened state to provide access to the object forming chamber; and a gas flow system for providing a gas flow across the build platform section, wherein the gas flow system comprises a first main body section extending within the main body and a door section being an integrated or attached part of the door, wherein the door section comprises a first opening structure arranged to release gas to or receive gas from the build platform section in the closed state of the door.

2. The device of claim 1, wherein the gas flow system further comprises a second main body section with a second opening structure opposite to the first opening structure with respect to the build platform section, and wherein the first main body section, the door section, and the second main body section provide a recirculated flow path of gas through the object forming chamber.

3. The device of claim 2, wherein the gas flow system is configured to release gas from one of the first opening structure and the second opening structure into the object forming chamber, and receive gas including smoke from a respective other opening in the closed state of the door during manufacturing of the three-dimensional object.

4. The device of claim 2, wherein at least one of the first opening structure or the second opening structure is located at a height of 0 to 5 cm, respectively, to the build platform section in a lateral direction of the opening and facing the build platform section.

5. The device of claim 1, wherein the first main body section comprises a main body port, and wherein the door section comprises a door port arranged with respect to the main body port to provide a fluid connection between the first main body section and the door section in the closed state of the door.

6. The device of claim 5, further comprising a door sealing system for providing a sealing between the door and the front wall along a circumferential sealing path around the opening to seal the object forming chamber gas-tight, wherein the fluid connection between the first main body section and the door section is arranged to be within the sealed object forming chamber, such that a leakage of the fluid connection is released into the sealed object forming chamber.

7. The device of claim 6, wherein the door comprises an inner surface delimited by the sealing path, and wherein the door port is arranged on the inner surface.

8. The device of claim 7, wherein the door comprises a door plate and at least one of one or more first channels integrated in the door plate or one or more second channels attached to the door and extending on the inner surface, and wherein the at least one of the one or more first channels or the one or more second channels are configured to fluidly connect, as part of the door section of the gas flow system, at least one opening structure including the first opening structure, with the door port.

9. The device of claim 5, wherein the door further comprises one or more channels each having one or more opening structures at respective positions of the door.

10. The device of claim 9, wherein the door further comprises a switch for selectively controlling the fluid connection from the door port to the one or more channels.

11. The device of claim 9, wherein the first opening structure for releasing gas into the gas forming chamber and the one or more channels are configured to compensate for pressure and flow variations along the first opening structure.

12. The device of claim 1, wherein the gas flow system further comprises a filter downstream of the first opening structure or attached to the first opening structure at which gas is received.

13. The device of claim 1, wherein the door comprises a door plate and the door section comprises a first flow former forming the first opening structure, wherein the first flow former is attached to or integrated into the door plate.

14. The device of claim 13, wherein the gas flow system further comprises a second main body section with a second opening structure opposite to the first opening structure with respect to the build platform section, and wherein the second main body section comprises a second flow former forming the second opening structure, wherein the second flow former is attached to or integrated into a back side delimiting the object forming chamber at the side opposite to the door.

15. The device of claim 14, wherein the first flow former and the second flow former are positioned and configured to direct gas across the build platform section and to receive alternatively gas smoke originating on the build platform section, respectively, thereby enforcing the gas flow across the build platform section.

* * * * *